(12) United States Patent
Lee et al.

(10) Patent No.: US 11,334,631 B1
(45) Date of Patent: May 17, 2022

(54) METHOD AND APPARATUS FOR IDENTIFYING DEVICES USING COLLECTIVE INTELLIGENCE

(71) Applicant: KOREA INTERNET & SECURITY AGENCY, Jeollanam-do (KR)

(72) Inventors: Jae Hyuk Lee, Jeollanam-do (KR); Woong Go, Jeollanam-do (KR); Hong Geun Kim, Jeollanam-do (KR); Sung Taek Oh, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 0 days.

(21) Appl. No.: 17/200,600

(22) Filed: Mar. 12, 2021

(30) Foreign Application Priority Data

Nov. 16, 2020 (KR) .......................... 10-2020-0153177

(51) Int. Cl.
*G06F 16/907* (2019.01)
*G06F 16/906* (2019.01)
*G06F 16/23* (2019.01)

(52) U.S. Cl.
CPC ........ *G06F 16/907* (2019.01); *G06F 16/2365* (2019.01); *G06F 16/906* (2019.01)

(58) Field of Classification Search
CPC ........................... G06F 16/907; G06F 16/2365
USPC ........................................................ 707/700
See application file for complete search history.

(56) References Cited

U.S. PATENT DOCUMENTS

| 2015/0188879 | A1* | 7/2015 | Cha | H04L 41/5035 |
| | | | | 709/223 |
| 2017/0222922 | A1* | 8/2017 | Zlatokrilov | H04L 45/74 |
| 2018/0270229 | A1* | 9/2018 | Zhang | H04W 12/06 |
| 2019/0380161 | A1* | 12/2019 | Song | H04W 84/18 |

FOREIGN PATENT DOCUMENTS

KR     10-1893592     8/2018

OTHER PUBLICATIONS

Comer, Douglas E., Internetworking with RCP/IP—vol. I: Principles, Protocols, and Architecture, 2nd Edition, Prentice Hall, Englewood Cliffs, NJ, © 1991, pp. 1-3 and 89-95.*
Choi, Kwangjin, et al., "Pattern Matching of Packet Payload for Network Traffic Classification", NGNCON 2006, Jeju, Korea, Jul. 9-13, 2006, pp. 130-132.*

* cited by examiner

*Primary Examiner* — Robert Stevens
(74) *Attorney, Agent, or Firm* — Studebaker & Brackett PC

(57) ABSTRACT

Provided is a method performed by a computing device for identifying a device. The method include receiving a target packet from an identification target device, extracting a pattern of the target packet, the target packet being transmitted by the identification target device from the packet, matching the pattern of the target packet with at least one of packet patterns stored in an identification information DB, comparing a first model name with a second model name, the first model name being corresponding to the matched pattern stored in the identification information DB, the second model name being selected by a user of a user terminal, and transmitting a proposed model name to the user terminal based on determining that the first model name and the second model name are different, the proposed model name being used for connection between the user terminal and the identification target device.

19 Claims, 11 Drawing Sheets

FIG. 4

| PRODUCT NAME | MODEL NAME | NUMBER OF PACKETS | TRANSMISSION IP | TRANSMISSION/ RECEPTION TIME INTERVAL | BURST INFORMATION | PACKETS PER SECOND | PACKET TRANSMISSION SIZE PER SECOND | TOTAL TRANSMISSION SIZE | PACKET TIME INFORMATION |
|---|---|---|---|---|---|---|---|---|---|
| KT GIGA GENIE | KR102013 | 149 | 155.154.121.111 | 0.006 | | 4 | 863 | 15,615 | 152 |
| | | 150 | 155.154.121.111 | 0.007 | | 5 | 843 | 14,154 | 143 |
| | | 151 | 155.154.121.111 | 0.006 | | 4 | 759 | 16,547 | 151 |
| | | 150 | 155.154.121.111 | 0.005 | | 6 | 687 | 14,657 | 160 |
| | | 149 | 155.154.121.111 | 0.004 | | 4 | 758 | 17,655 | 155 |

⇕

| PRODUCT NAME | MODEL NAME | NUMBER OF PACKETS | TRANSMISSION IP | TRANSMISSION/ RECEPTION TIME INTERVAL | BURST INFORMATION | PACKETS PER SECOND | PACKET TRANSMISSION SIZE PER SECOND | TOTAL TRANSMISSION SIZE | PACKET TIME INFORMATION |
|---|---|---|---|---|---|---|---|---|---|
| KT GIGA GENIE | KR102013 | 149<T<151 | 155.154.121.111 | 0.004<t<0.007 | 4<t<6 | 54 | 687<t<863 | 14,154<t<17,655 | 143<t<160 |

FIG. 7

| MODEL CLASSIFICATION | PRODUCT NAME | MODEL NAME | NUMBER OF PACKETS | TRANSMISSION IP | TRANSMISSION/ RECEPTION TIME INTERVAL | BURST INFORMATION | PACKETS PER SECOND | PACKET TRANSMISSION SIZE PER SECOND | TOTAL TRANSMISSION SIZE | PACKET TIME INFORMATION | RANDOM FOREST RESULT | NUMBER OF USER SELECTIONS | NUMBER OF SELECTION FAILURES |
|---|---|---|---|---|---|---|---|---|---|---|---|---|---|
| AI SPEAKER | KT GIGA GENIE | KR102013 | 149 | 155.154.121.111 | 0.006 | 4 | 54 | 863 | 15,615 | 152 | KR102013 | 120 | 50 |
|  |  |  | 150 | 155.154.121.111 | 0.007 | 5 | 54 | 843 | 14,154 | 143 | KR102013 | 100 | 50 |
|  |  |  | 151 | 155.154.121.111 | 0.006 | 4 | 54 | 759 | 16,547 | 151 | KR102013 | 25 | 12 |
|  |  |  | 150 | 155.154.121.111 | 0.005 | 6 | 54 | 687 | 14,657 | 160 | KR102013 | 100 | 50 |
|  |  |  | 149 | 155.154.121.111 | 0.004 | 4 | 54 | 758 | 17,655 | 155 | KR102013 | 50 | 40 |

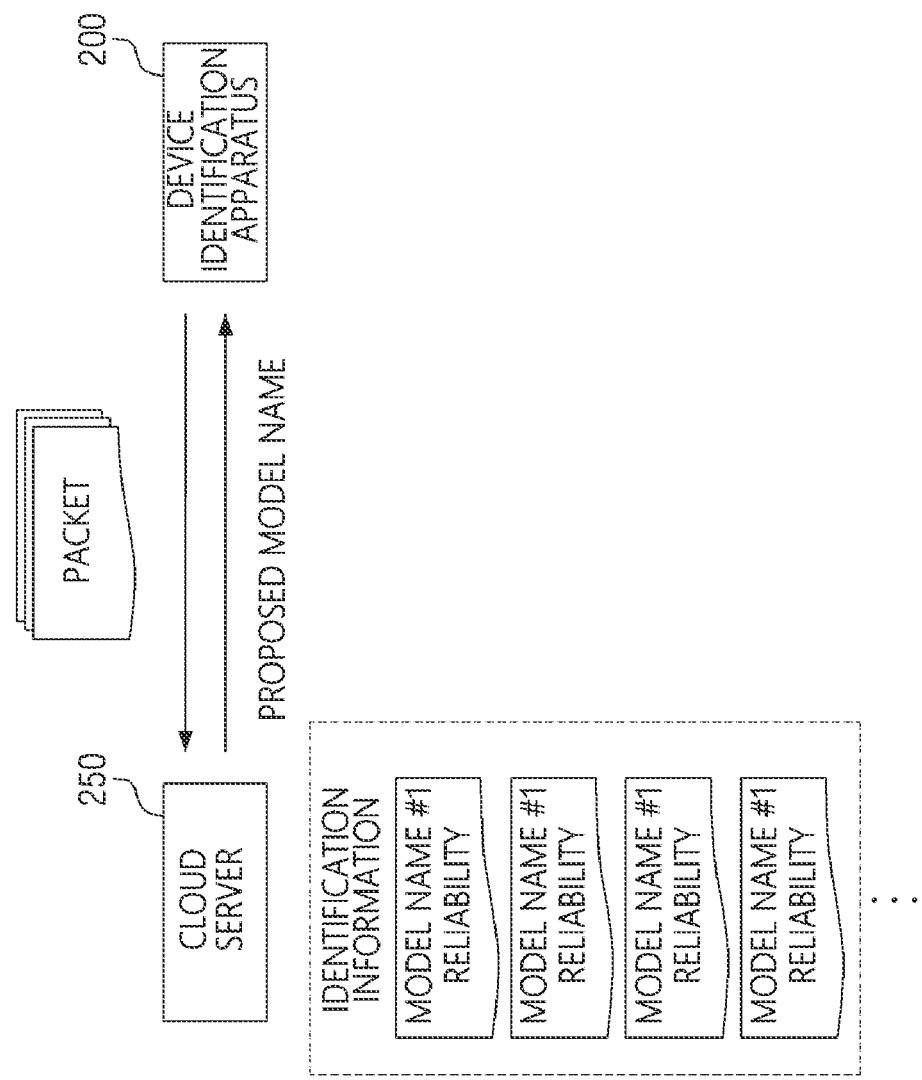

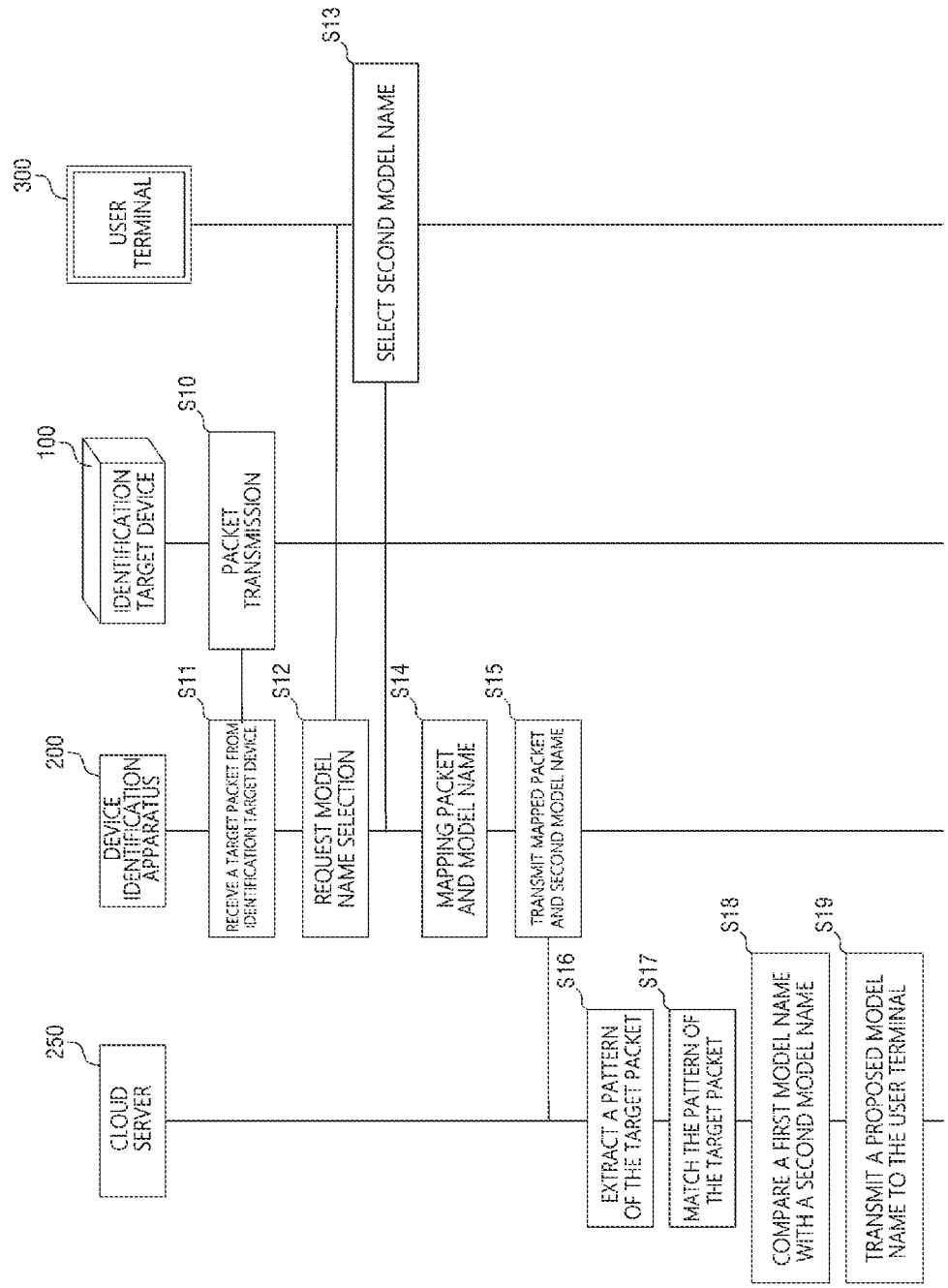

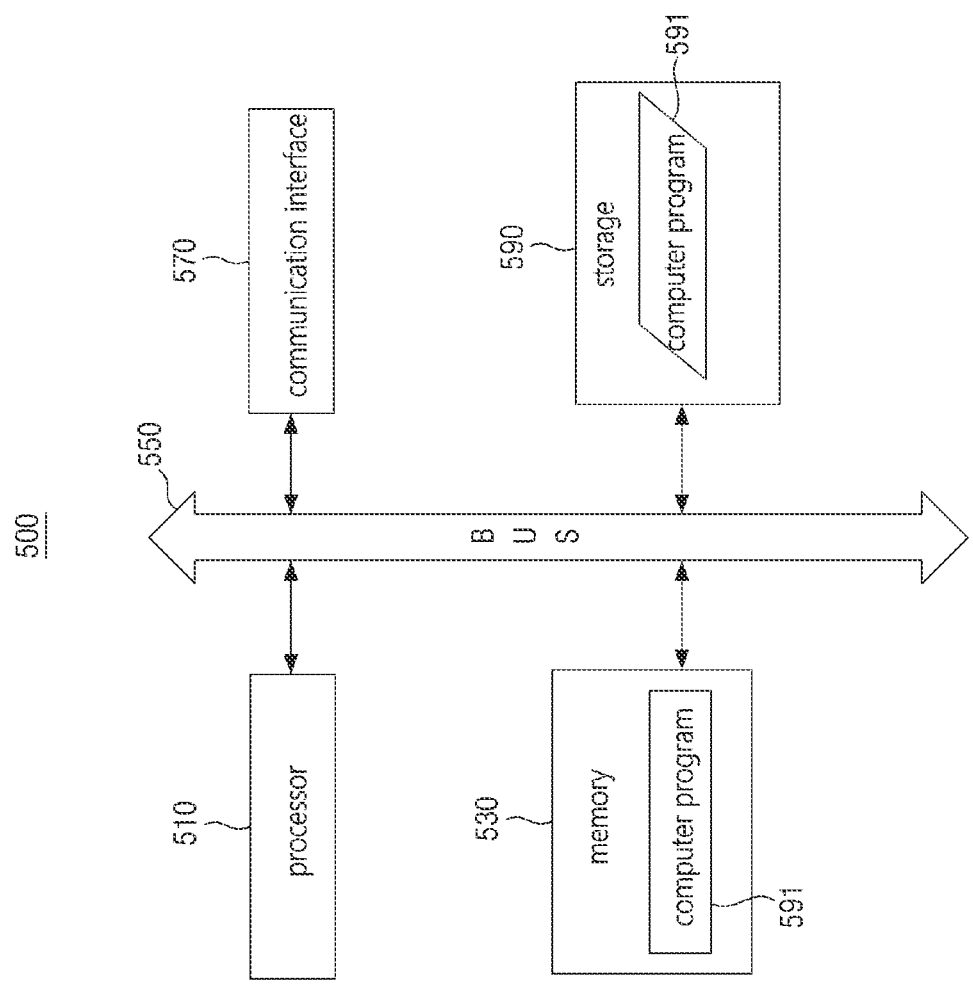

METHOD AND APPARATUS FOR IDENTIFYING DEVICES USING COLLECTIVE INTELLIGENCE

This patent application claims the benefit of Korean Patent Application No. 10-2020-0153177, filed on Nov. 16, 2020, which is hereby incorporated by reference in its entirety into this application.

FIELD

The present disclosure relates to a device identification method and apparatus. In more detail, the present disclosure relates to a device identification method and apparatus capable of improving the reliability of device information provided to a user terminal by correcting identification information of information capable of identifying a device using collective intelligence.

DESCRIPTION OF THE RELATED ART

In order to be operated by the manipulation of the user terminal, an identification target device such as IoT should necessarily perform a connection operation with the user terminal, and at this time, identification of the identification target device should be performed. However, this process can be performed on the premise that the user terminal knows information such as the model name of the identification target device.

Sometimes the exact model name of the identification target device is provided to the user, but based on the model name not being displayed on the exterior, the identification target device may be shielded, or in a location that is difficult to access, the user cannot check the model name. In this case, the user may have difficulty connecting with the identification target device.

Further, based on the model name, the name, etc. of the identification target device not being known and various information of the identification target device is roughly guessed and provided to the user, the information may not be accurate, and reliability problem may occur. Based on the information on the identification target device not being known, the reliability of the information on the identification target device is low, and accurate information may not be provided.

It is necessary to develop a technology capable of providing accurate information to a user by securing the reliability of the information of the identification target device even when the information of the identification target device is unknown.

SUMMARY

The technical problem to be solved by the present disclosure is to provide a device identification method and apparatus capable of correcting information capable of identifying a device using collective intelligence.

Another technical problem to be solved by the present disclosure is to provide a device identification method and apparatus capable of providing an accurate model name with higher reliability by providing a model name to a user terminal using identification information with improved reliability.

Another technical problem to be solved by the present disclosure is to provide a device identification method and apparatus capable of checking the reliability of information about an identification target device currently stored using information obtained from a plurality of users.

Another technical problem to be solved by the present disclosure is to provide a device identification method and apparatus capable of constructing more reliable information by reflecting information obtained from a plurality of users in information correction.

Another technical problem to be solved by the present disclosure is to provide a device identification method and apparatus that can play a role to assist in easily connecting the user terminal and the identification target device even though the model name may not be displayed on the exterior, the identification target device is shielded, or is in a location that is difficult to access.

The technical problems of the present disclosure may not be limited to the technical problems mentioned above, and other technical problems that may not be mentioned will be clearly understood by those skilled in the art from the following description.

Aspects of the present disclosure, there is provided a method for identifying a device. The method is performed by a computing device for identifying a device comprising receiving a target packet from an identification target device, extracting a pattern of the target packet, the target packet being transmitted by the identification target device from the packet, matching the pattern of the target packet with at least one of packet patterns stored in an identification information database (DB), comparing a first model name with a second model name, the first model name being corresponding to the matched pattern stored in the identification information DB, the second model name being selected by a user of a user terminal, and transmitting a proposed model name to the user terminal based on determining that the first model name and the second model name may be different, the proposed model name being used for connection between the user terminal and the identification target device.

According to another aspect of the present disclosure, there is provided a method, transmitting the proposed model name to the user terminal comprises, transmitting the first model name to the user terminal based on determining that the first model name and the second model name may be different.

According to another aspect of the present disclosure, there is provided a method, wherein transmitting the proposed model name to the user terminal comprises, determining reliability of the first model name; and updating the identification information DB to replace the first model name with the second model name based on the reliability of the first model name being less than a threshold.

According to another aspect of the present disclosure, there is provided a method, wherein updating the identification information DB comprises, transmitting the second model name to the user terminal.

According to another aspect of the present disclosure, there is provided a method, wherein determining reliability of the first model name comprises, calculating the ratio of the number of times where the user selected the first model name as the model name of the identification target device over the number of times where the user selected the second model name as the model name of the identification target device.

According to another aspect of the present disclosure, there is provided a method, identifying the pattern of the target packet as a new packet pattern based on determining that the pattern of the target packet matches none of packet patterns stored the identification information DB, and registering the new packet pattern in the identification information DB.

According to another aspect of the present disclosure, there is provided a method, wherein registering the new packet pattern in the identification information DB comprises, registering a model name selected by the user of the user terminal as the model name corresponding to the new packet pattern.

According to another aspect of the present disclosure, there is provided a method, wherein matching the pattern of the target packet comprises, identifying a range of an attribute value associated with one of the packet patterns stored in the identification information DB; and determining whether an attribute value associated with the target packet falls within the identified range.

According to another aspect of the present disclosure, there is provided a method, wherein matching the pattern of the target packet comprises, determining whether the number of packet patterns stored in the identification information DB is less than a predetermined minimum number; and based on determining that the number of packet patterns may be less than the predetermined minimum number, verifying a result of the matching using a random forest model.

According to another aspect of the present disclosure, there is provided a method, wherein matching the pattern of the target packet comprises, determining a model classification, a product name and a model name of the identification target device using at least one of the number of packets, an IP address of a device from which the identification target device received a packet, transmission/reception time interval, burst information, the number of packets per second, packet transmission size per second, total transmission size, and packet time information associated with the identification target device.

According to another aspect of the present disclosure, there is provided a method, wherein receiving the target packet from the identification target device comprises, receiving at least some of the target packets transmitted by the identification target device to another device.

According to another aspect of the present disclosure, there is provided a method, the method further comprises requesting the user terminal to select a model name corresponding to the identification target device upon receiving the packet from the identification target device; and receiving a selection of the model name corresponding to the identification target device from the user terminal.

According to another aspect of the present disclosure, there is provided a system. The system for identifying a device identification apparatus is configured to request a user terminal to select a model name corresponding to an identification target device upon receiving a target packet from the identification target device, and receive a selection of the model name corresponding to the identification target device from the user terminal; and a cloud server is configured to extract a pattern of the target packet received from the device identification apparatus, match the pattern of the target packet with at least one of packet patterns stored in an identification information DB, compare a first model name with a second model name, the first model name being corresponding to the matched pattern stored in the identification information DB, the second model name being selected by a user of the user terminal, and transmit a proposed model name to the user terminal based on determining that the first model name and the second model name may be different, the proposed model name being used for connection between the user terminal and the identification target device.

According to another aspect of the present disclosure, there is provided a system, wherein the cloud server transmits the first model name to the user terminal based on determining that the first model name and the second model name may be different.

According to another aspect of the present disclosure, there is provided a system, wherein the cloud server determines reliability of the first model name, and updates the identification information DB to replace the first model name with the second model name based on the reliability of the first model name being less than a threshold.

According to another aspect of the present disclosure, there is provided a system, wherein the cloud server transmits the second model name to the user terminal.

According to another aspect of the present disclosure, there is provided an apparatus. The apparatus for identifying a device comprises a processor, a network interface, a memory executed by the processor to load a computer program, and a storage for storing the computer program, wherein the computer program comprises, an instruction for receiving a target packet from an identification target device, an instruction for extracting a pattern of a target packet, the target packet being transmitted by the identification target device from the packet, an instruction for matching the pattern of the target packet with at least one of packet patterns stored in an identification information DB, an instruction for comparing a first model name with a second model name, the first model name being corresponding to the matched pattern stored in the identification information DB, the second model name being selected by a user the user terminal, and an instruction for transmitting a proposed model name to the user terminal based on determining that the first model name and the second model name may be different, the proposed model name being used for connection between the user terminal and the identification target device.

According to another aspect of the present disclosure, there is provided an apparatus, wherein the instruction for transmitting the proposed model name to the user terminal comprises, an instruction for transmitting the first model name to the user terminal based on determining that the first model name and the second model name may be different.

According to another aspect of the present disclosure, there is provided an apparatus, wherein the instruction for transmitting the proposed model name to the user terminal comprises, an instruction for determining reliability of the first model name; and an instruction for updating the identification information DB to replace the first model name with the second model name based on reliability of the first model name being less than a threshold.

According to another aspect of the present disclosure, there is provided an apparatus, wherein the instruction for updating the identification information DB comprises, an instruction for calculating the ratio of the number of times where the user selected the first model name as the model name of the identification target device over the number of times where the user selected the second model name as the model name of the identification target device.

BRIEF DESCRIPTION OF THE DRAWINGS

FIG. 4 is a diagram illustrating an example of converting information of a packet transmitted by an identification target device into data having a section range.

FIG. 7 is a diagram for describing an example of calculating the reliability of identification information stored in a DB by using collective intelligence.

FIG. 9 is a diagram for describing information transmitted and received between a cloud server and a device identification device.

FIG. 10 is a flowchart of a device identification system according to another embodiment of the present disclosure.

FIG. 11 is a hardware configuration diagram of a device identification apparatus according to another embodiment of the present disclosure.

DETAILED DESCRIPTION

Figure 1:
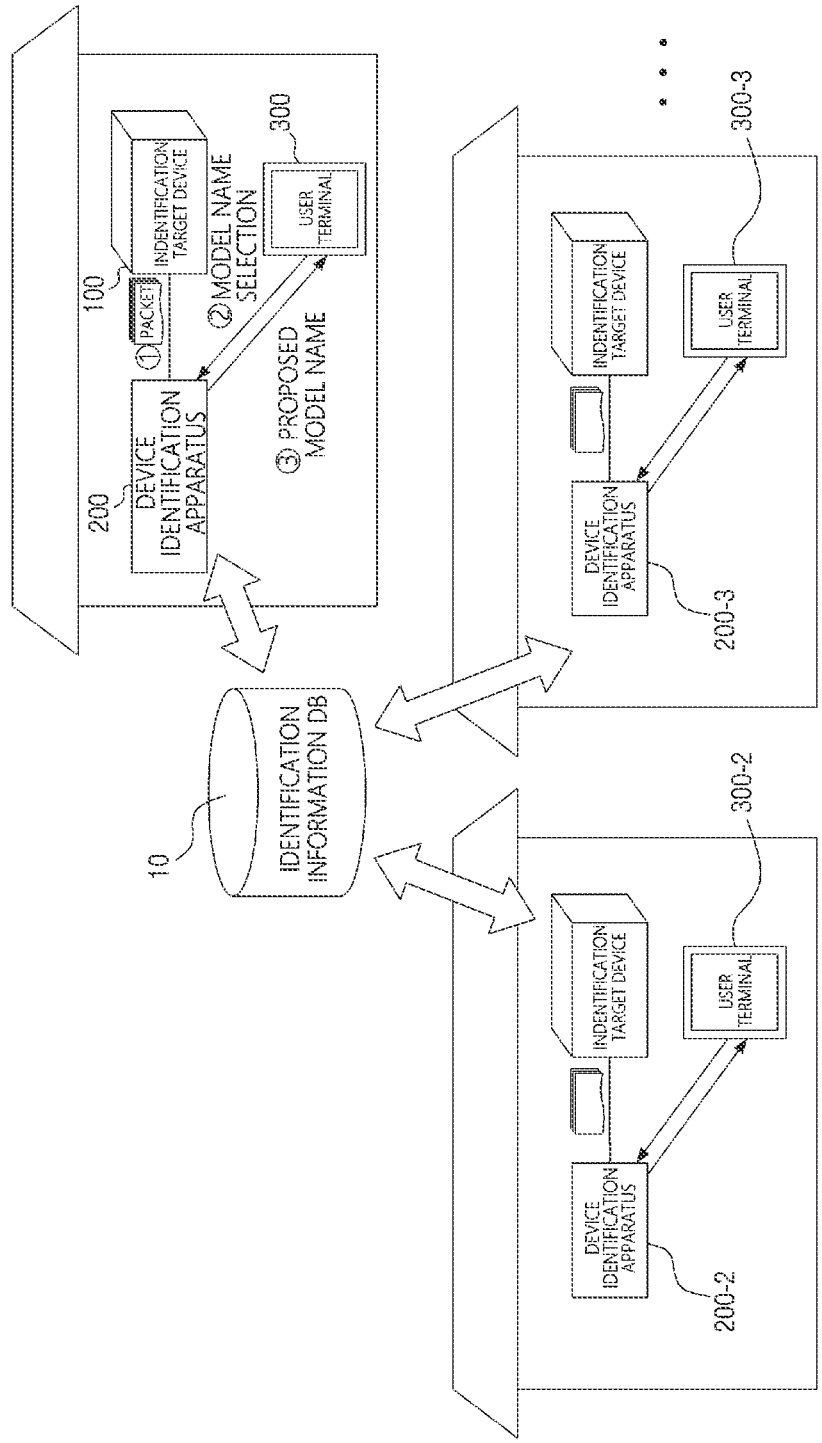
FIG. 1 is an exemplary diagram of a device identification system according to an embodiment of the present disclosure.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

In adding reference numerals to the components of each drawing, it should be noted that the same reference numerals may be assigned to the same components as much as possible even though they may be shown in different drawings. In addition, in describing the present disclosure, when it may be determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries may not be interpreted unless they may be specifically defined clearly. The terminology used herein may be for the purpose of describing embodiments and may not be intended to be limiting of the present disclosure. In this specification, the singular also includes the plural unless specifically stated otherwise in the phrase.

In addition, in describing the component of this present disclosure, terms, such as first, second, A, B, (a), (b), can be used. These terms may distinguish the components from other components, and the nature or order of the components may not be limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present disclosure will be described in detail with reference to the accompanying drawings.

FIG. 1 is an exemplary diagram of a device identification system according to an embodiment of the present disclosure.

Referring to FIG. 1, the device identification system according to the present disclosure may include an identification target device 100, a device identification apparatus 200, and a user terminal 300.

The device identification system may be a system that assists the connection between the user terminal 300 and the identification target device 100 by using the device identification apparatus 200. In the present specification, the identification target device 100 may be an Internet of Things (IoT) apparatus, but may not be limited thereto.

The device identification apparatus 200 may analyze the model name of the identification target device 100 in the process of connecting the user terminal 300 and the identification target device 100 at a location adjacent to the identification target device 100, and provide the corresponding proposed or recommended model name to the user terminal 300.

The device identification apparatus 200 may analyze the pattern of the target packet transmitted by the identification target device 100, and uses the identification information DB 10 storing the model name for the pattern of the target packet to provide the model name of the identification target device 100 to the user terminal 300. In this case, the device identification apparatus 200 may determine a model name corresponding to the pattern of the target packet by using the identification information DB 10 having improved reliability due to collective intelligence.

For example, the device identification apparatus 200 may assist in device identification in a process, in which the user terminal 300 connects with the identification target device 100. The device identification apparatus 200 may receive a selection of a model name of the identification target device 100 from the user terminal 300 after receiving a target packet from the identification target device 100. The device identification apparatus 200 may analyze a pattern of a target packet matching the identification information using identification information stored in the identification information DB 10 and select a corresponding model name.

At this time, based on the model name corresponding to the identification information stored in the identification information DB 10 and the model name selected by the user being the same, it may be possible to provide the information of the corresponding model name to the user without taking any other measures since the user's opinion and the identification information stored in the identification information DB 10 may be the same. Thereafter, the user terminal 300 can easily connect to the identification target device 100 using the provided model name.

If the model name corresponding to the identification information stored in the identification information DB 10 and the model name selected by the user may be different, one of the identification information DB 10 and the user's opinion may be correct information since the user's opinion and the identification information stored in the identification information DB 10 may be different.

Based on the model name corresponding to the identification information stored in the identification information DB 10 and the model name selected by the user being different, the device identification system according to the present disclosure can use collective intelligence to check the reliability and correct the identification information based on confirming that the reliability of the identification information may be low in order to improve the reliability of the identification information stored in the identification information DB 10.

Since the device identification system according to the present disclosure provides a model name to the user terminal 300 using identification information having improved reliability, an accurate model name with higher reliability can be provided.

Further, the device identification system plays a role that can assist to easily connect the user terminal 300 and the identification target device 100 even though the model name may not be displayed on the exterior, the identification target device 100 may be shielded, or may be in a location that is difficult to access.

On the other hand, among the identification information stored in the identification information DB 10, the second device identification apparatus 200-2 may improve the reliability in the process of connecting the second user terminal 300-2 and the identification target device 100, and the third device identification apparatus 200-3 may additionally improve the reliability in the process of connecting the third user terminal 300-3 and the identification target device 100.

The identification information stored in the identification information DB 10 may be updated by the second device identification apparatus 200-2 and the third device identification apparatus 200-3 so that reliability may be improved. The first device identification apparatus 200 may determine a model name of the identification target device 100 using the identification information updated so as to improve the reliability and provide it to the first user terminal 300.

That is, based on the first identification target device 100 providing a proposed model name to the user terminal 300 in the process of connecting the first user terminal 300 and the identification target device 100, since the identification information DB 10 with reliability improved by the collective intelligence of the second device identification apparatus 200-2 and the third device identification apparatus 200-3 may be used, identification information with higher reliability can be provided to the user terminal 300.

Up to now, the device identification system of the present disclosure has been schematically described with reference to FIG. 1. Hereinafter, a device identification method will be described with reference to FIGS. 2 to 10. This embodiment may be performed by a computing device. For example, the computing device may be a device identification apparatus. In describing the present embodiment, the description of a subject performing some operations may be omitted. In this case, the performing subject may be the computing device.

Figure 2:
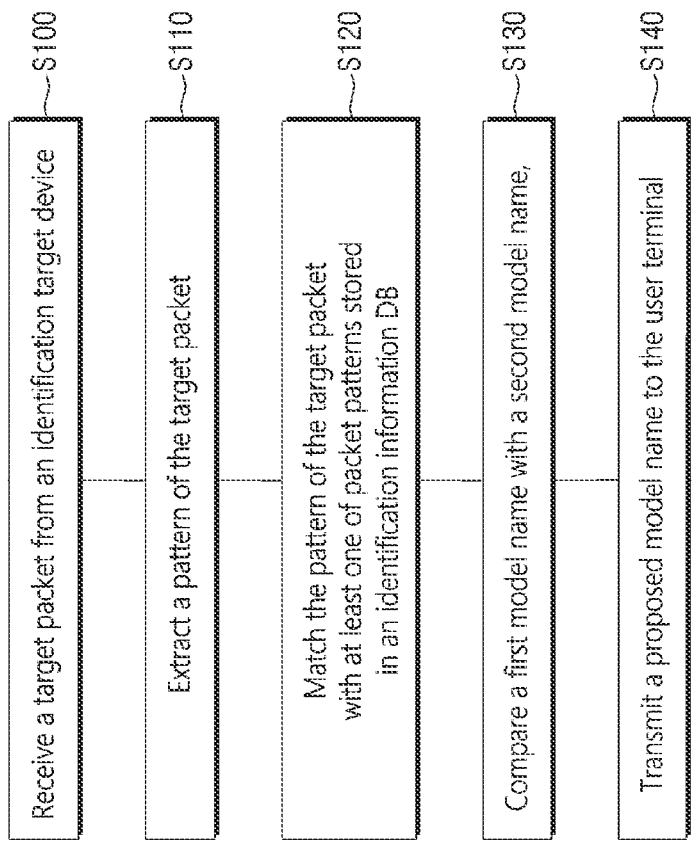
FIG. 2 is a flowchart of a device identification method according to an embodiment of the present disclosure.
Figure 3:
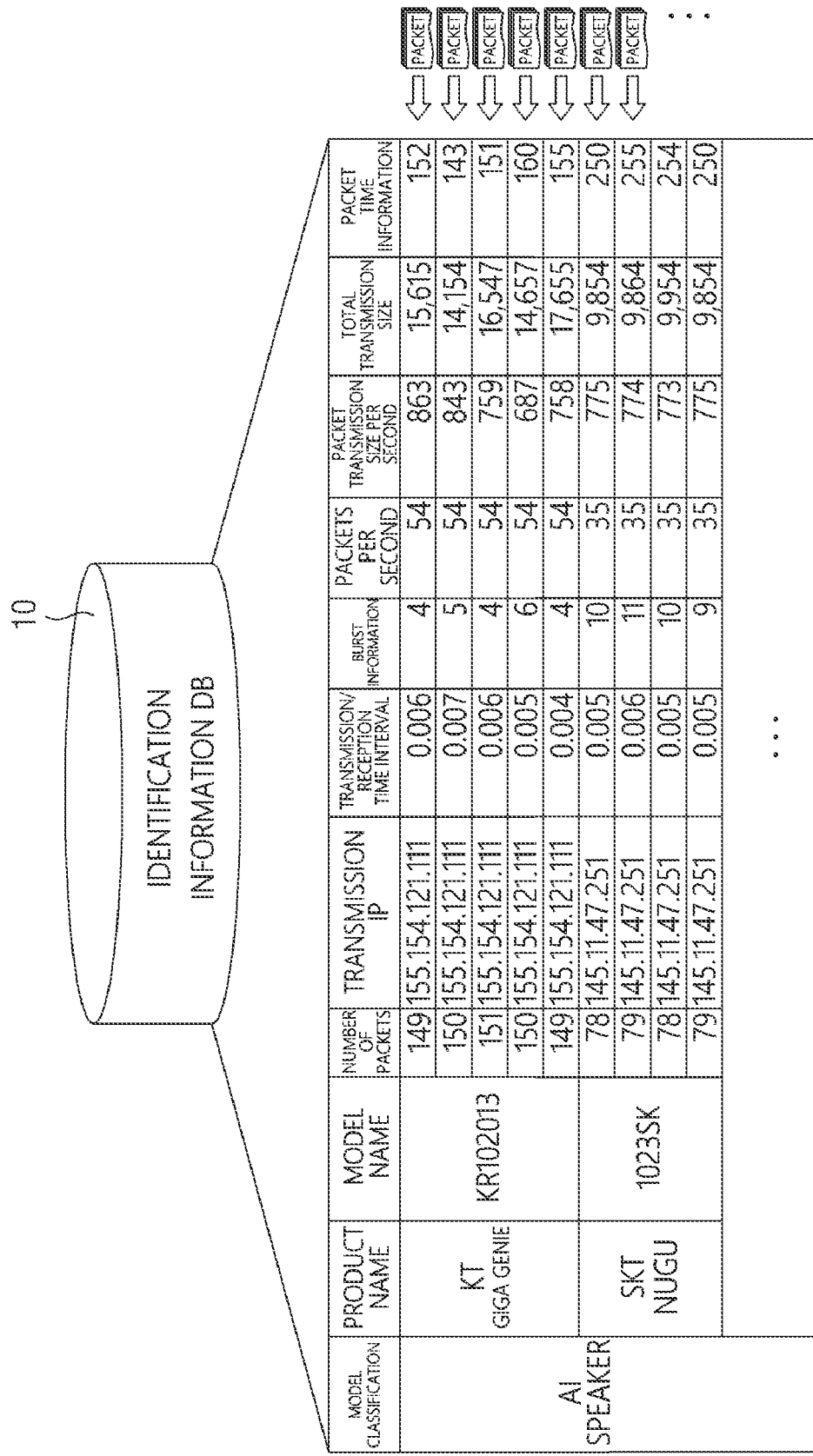
FIG. 3 is an example of an identification information DB storing information on a packet transmitted by an identification target device.

FIG. 2 is a flowchart of a device identification method according to an embodiment of the present disclosure, and FIG. 3 is an example of an identification information DB 10 storing information of a target packet transmitted by the identification target device 100, and FIG. 4 is a diagram illustrating an example of converting information of a target packet transmitted by the identification target device 100 into data having a section range.

In step S100 of FIG. 2, a target packet may be transmitted from the identification target device 100. The identification target device 100 may regularly or irregularly transmit packets to the outside, and the device identification apparatus 200 may receive packets transmitted by the identification target device 100. In this case, the device identification apparatus 200 may receive some packets that the identification target device 100 transmits to the outside.

The device identification apparatus 200 may directly receive a target packet or may be connected to an AP (Access Point) for communication with the identification target device 100 to obtain a target packet of the identification target device 100.

Thereafter, in step S110, a pattern of a target packet transmitted by the identification target device 100 may be extracted from the target packet. The target packet contains various information about the target packet of the identification target device 100, and may include the number of packets, an IP address of a device from which the identification target device received a packet, transmission/reception time interval, burst information, the number of packets per second, packet transmission size per second, total transmission size, packet time information associated with the identification target device, as shown in FIG. 3.

As shown in FIG. 3, the identification information DB 10 may store packet information obtained from the identification target device 100. Based on the product name of the AI speaker model being 'KT Giga Genie' and the model name may be 'KR102013,' the identification information DB 10 may store the packet information, in which the number of packets may be '149,' the transmission IP may be '155.154.121.111,' the burst information may be '4,' the number of packets per second may be '54,' the packet transmission size per second may be '863,' the total transmission size may be 15,615 bytes, and the packet time information may be '154.'

Further, based on the product name of the AI speaker model being 'KT Giga Genie,' the model name may be 'KR102013' and the IP address may be '155.154.121.111,' which may be the same as the above, the identification information DB 10 may store information, in which the number of packets may be '150' or '151,' etc., and burst information, packets per second, packet transmission size per second, total transmission size, and packet time information may be different.

Further, based on the product name of the AI speaker model being 'SKT NUGU' and the model name may be '1023SK,' the identification information DB 10 may store information including the number of respective packets, transmission/reception time intervals, burst information, packets per second, packet transmission size per second, total transmission size and packet time information.

Thereafter, in step S120, it may be determined whether the pattern of the target packet transmitted by the identification target device 100 matches at least one of the packet patterns stored in the identification information DB 10. For example, a corresponding model name may be determined while matching a pattern of a target packet obtained from the current identification target device 100 with the identification information DB 10 one by one.

As shown in FIG. 4, the identification information DB 10 may have information, in which packet information transmitted by the identification target device 100 may be converted into data having a section range.

For example, a section of a range of an attribute value associated with one of the packet patterns stored in the identification information DB 10 may be identified, and it may be determined whether an attribute value associated with the target packet falls within the identified range. Thereafter, based on an attribute value associated with the target packet falling within the identified range, the pattern of the target packet may match at least one among the packet patterns stored in the identification information DB 10.

For example, as shown in FIG. 4, based on the model name of the product name 'KT Giga Genie' being 'KR102013' and the transmission IP being '155.154.121.111,' the number of packets can be converted into a range of '149<T<151,' and the transmission/reception interval can be converted into the range of '0.004<T<0.007,' the burst information can be converted into the range of '4<T<6,' the packets per second can be converted into 54, the packet transmission size per second can be converted into '687<T<863,' the total transmission size can be converted into 14,154<T<17,655, and packet time information can be converted into the range of '143<T<160.' In this step, it may be matched the pattern of the target packet obtained from the current identification target device 100 using the identification information having the section range.

Figure 5:
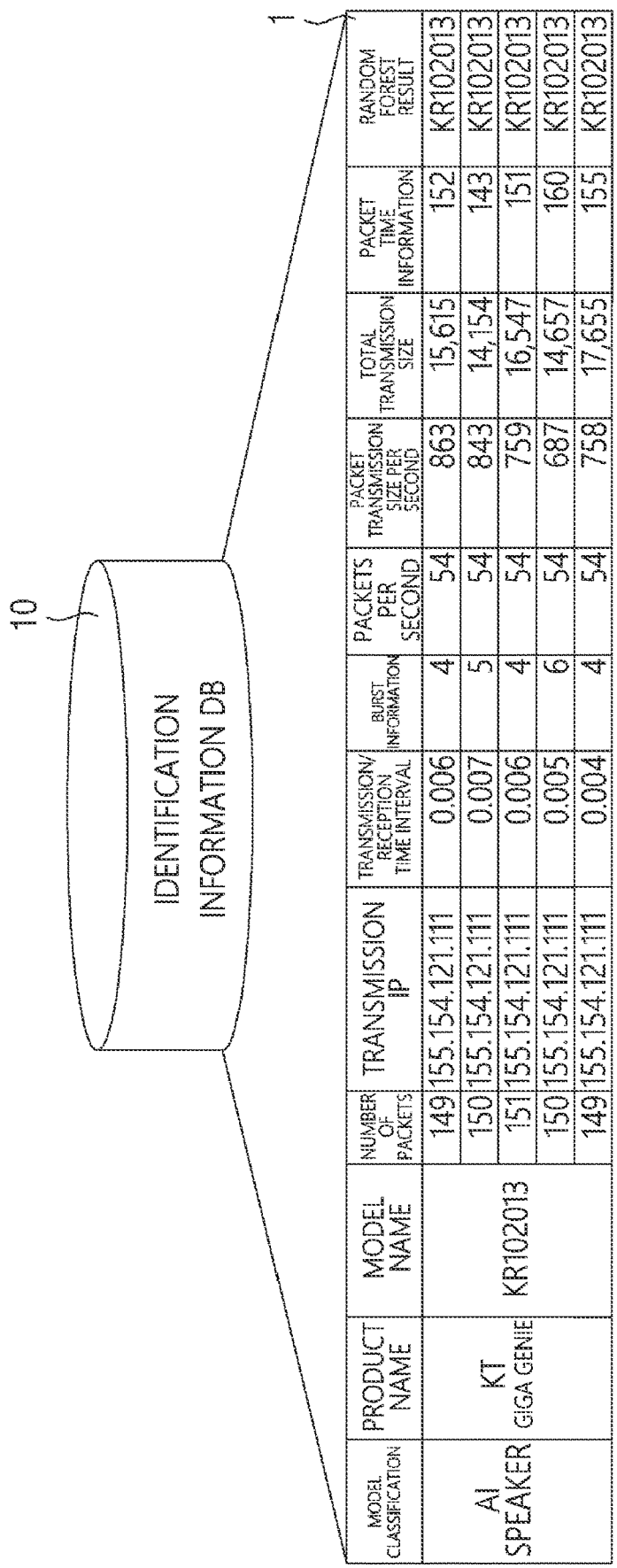
FIG. 5 is an example illustrating a result of performing additional verification on a packet of an identification information DB using a random forest model.

FIG. 5 is an example illustrating a result of performing additional verification on a packet of the identification information DB 10 using a random forest model.

Based on the pattern of the target packet transmitted by the identification target device 100 matching at least one of the packet patterns stored in the identification information DB 10 in step S120, a comparison may be performed to check whether the number of packet patterns stored in the identification information DB 10 may be less than the predetermined minimum number. In one example, the predetermined amount of initial data may be set to 10.

If the number of packet patterns stored in the identification information DB 10 may be less than the predetermined minimum number, additional verification of the matched result may be performed using a random forest model. That is, the verification on the result of the matching whether the pattern of the target packet transmitted by the identification target device 100 matches at least one of the packet patterns stored in the identification information DB 10 may be performed using the random forest model.

For example, as shown in FIG. 5, since the packet patterns stored in the identification information DB 10 may be less than predetermined 10 initial data, a random forest result field may be added to the identification information DB 10 to store the model name 1 of the result that uses a random forest model for each identification information.

If the pattern of the target packet transmitted by the identification target device does not match the identification information DB, the pattern of the target packet transmitted by the identification target device may be determined as a new packet, and the new packet may be registered in the identification information DB. Thereafter, for the identification information for the new packet, the pattern of the packet may be stored, and the model name may not be registered. In this case, a model name selected by a user requesting connection of the new packet may be registered as a model name for the new packet. Based on the user not selecting a model name, the model name selected by another user may be registered later.

Returning back to FIG. 2, a comparison of the first model name corresponding to the pattern matched in step S130 with the second model name selected by the user of the user terminal 300 may be performed. The second model name selected by the user may receive a selection from the user terminal 300 before step S120. For example, based on a target packet being received from the identification target device 100, the user terminal 300 may be requested to select a model name corresponding to the identification target device 100, and the selection of the model name corresponding to the identification target device 100 may be transmitted from the user terminal 300.

Based on the first model name and the second model name being different from each other as a result of the comparison in step S140, a proposed model name for connection of the user terminal 300 and the identification target device 100 may be transmitted to the user terminal 300.

Figure 6:
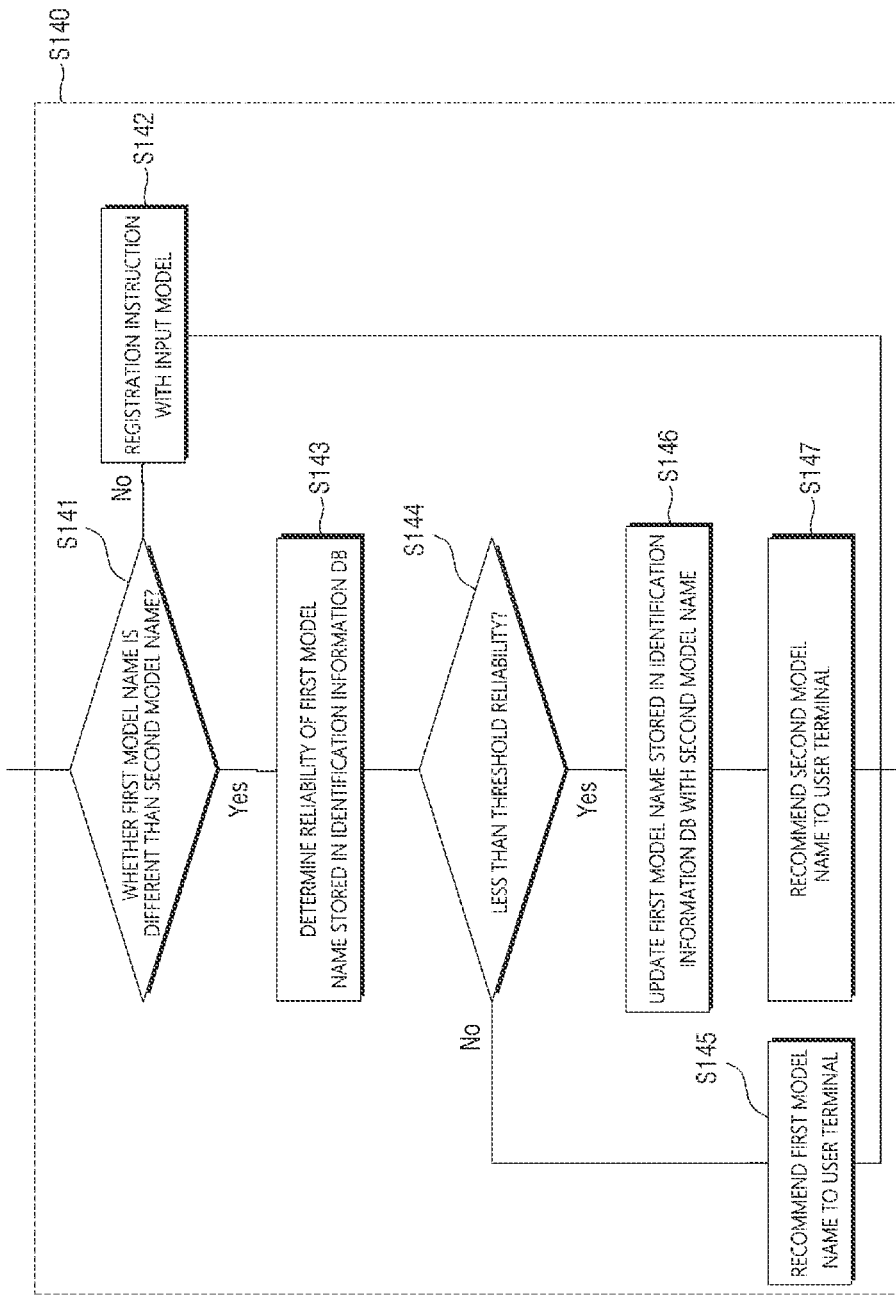
FIG. 6 is a diagram describing a process of comparing a first model name and a second model name in step S140 of FIG. 2.

In this case, based on the first model name and the second model name being different from each other as a result of the comparison, the first model name may be transmitted to the user terminal 300. Based on, as a result of the comparison, the first model name and the second model name being different from each other, the second model name may be transmitted to the user terminal 300 based on the reliability of the first model name stored in the identification information DB 10 being low. FIG. 6 will be referred to describe step S140 in detail.

FIG. 6 is a diagram illustrating a process of comparing a first model name with a second model name in step S140 of FIG. 2.

As a result of the comparison in step S141, it may be determined whether the first model name and the second model name may be different, and based on them being the same, a registration instruction with the model input in step S142 may be transmitted.

If the first model name and the second model name may be different as a result of the comparison, in step 143, in response to determining that the comparison result may be different, the reliability of the first model name corresponding to the pattern of the packet stored in the identification information DB 10 can be determined.

If the reliability of the first model name may be less than the threshold reliability in step S144, the first model name stored in the identification information DB 10 may be updated with the second model name and stored in the identification information DB 10.

In this step, the reliability of the first model name can be calculated. For example, the ratio of the number of the first model name selected by the user as the model name of the identification target device 100 and the number of the second model name selected by the user may be used to calculate the reliability of the first model name corresponding to the packet pattern stored in the identification information DB 10, and the reliability of the first model name and the threshold reliability may be compared. FIG. 7 will be referred to describe this in more detail.

FIG. 7 is a diagram for describing an example of calculating the reliability of identification information stored in a DB by using collective intelligence. As shown in FIG. 7, the fields of the number of user selections 2 and the number of selection failures 3 may be stored in the identification information DB 10. That is, the number of correct model name selections 2 and the number of selection failures 3 may be recorded based on the model name transmitted from the user. Human reliability may be the probability that a human will perform a task without committing an error, and a model name can be determined for a result with a reliability of 80% or more through quantitative analysis of human errors. Here, 'HEP (Human Error Probability)=number of errors/total number of error occurrence opportunities,' 'HEP=number of selections/(number of selections+number of selection failures),' and 'R (reliability)=(1-HEP).' For example, in the case of Giga Genie 2, based on the number that the user inputted the model name of Giga Genie 2 being 130 times and the number that the user inputted STK NUGU may be 15 times, 'HEP=15/(130+15)=0.103,' and the reliability can be calculated as 'R=(1−0.103)=0.89655 (89.7%).'

Returning back to FIG. 6, the reliability calculated as described above in step S144 may be compared with the threshold reliability. Based on the calculated reliability being greater than or equal to the threshold reliability, the first model name may be proposed to the user terminal 300 in step S145. In this case, the threshold reliability R may be 0.8.

If the calculated reliability may be less than the threshold reliability, the first model name stored in the identification information DB 10 may be updated with the second model name in step S146 and stored in the identification information DB 10. Thereafter, the second model name may be transmitted to the user terminal 300 in step S147.

The device identification method according to an embodiment of the present disclosure has the advantage of providing a more accurate model name by improving the reliability of the stored DB by using the collective intelligence of various users.

Figure 8:
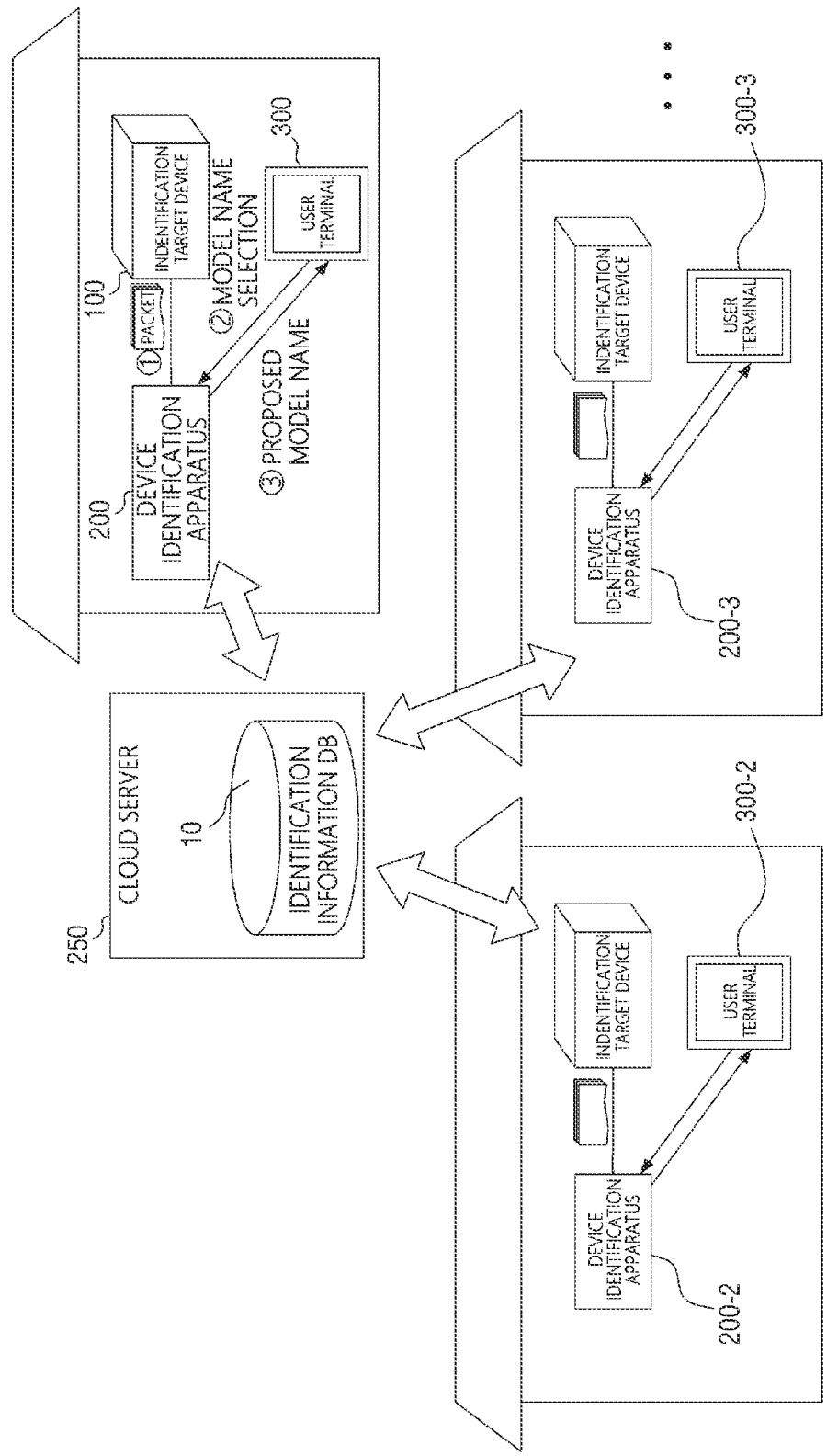
FIG. 8 is an exemplary diagram of a device identification system according to another embodiment of the present disclosure.

FIG. 8 is an exemplary diagram of a device identification system according to another embodiment of the present disclosure, FIG. 9 is a diagram for describing information transmitted and received between the cloud server 250 and a device identification apparatus, and FIG. 10 is a flow chart of a device identification system according to another embodiment of the present disclosure.

Referring to FIG. 8, a device identification system according to another embodiment of the present disclosure may include an identification target device 100, a device identification apparatus 200, a cloud server 250, and a user terminal 300.

In the present embodiment, since the identification target device 100 and the user terminal 300 may be the same as the above described configuration, the description thereof may be omitted, and it will be described focusing on the operation between the device identification apparatus 200 and the cloud server where there may be a difference in operation from the embodiment.

The cloud server 250 and the device identification apparatus 200 may separate and perform an operation performed by the device identification apparatus 200 as a single entity in an embodiment.

That is, based on the device identification apparatus 200 receiving a target packet from the identification target device 100, it may request the user terminal 300 to select a model name corresponding to the identification target device 100, and receive a selection of a model name corresponding to the identification target device 100 from the user terminal 300.

The cloud server 250 may extract the pattern of the target packet transmitted by the identification target device 100 from the target packet received from the device identification apparatus 200, and determine whether the pattern of the target packet transmitted by the identification target device 100 matches at least one of the packet patterns stored in the identification information DB 10. Further, the cloud server 250 compares the first model name corresponding to the matched pattern with the second model name selected by the user of the user terminal 300, and as a result of the comparison, based on the first model name and the second model name being different, a proposed model name for connection of the user terminal 300 and the identification target device 100 may be transmitted to the device identification device 200. In this case, the cloud server 250 may transmit the proposed model name for device connection to the user terminal 300 at once.

That is, as shown in FIG. 9, the cloud server 250 may receive a target packet from the device identification apparatus 200 and provide a corresponding proposed model name to the device identification apparatus 200 by using the identification information. At this time, the cloud server 250 may store and manage identification information such as model name #1 to model name #4, etc. while managing the identification information DB 10, and calculate and manage the reliability for each of the corresponding models. In this embodiment, the operation of calculating the reliability of the model name by the cloud server 250 may be the same as the operation in the embodiment, and will be omitted.

FIG. 10 is a flowchart of a device identification system according to another embodiment of the present disclosure.

Referring to FIG. 10, a target packet may be transmitted from the identification target device 100 to the device identification apparatus 200 in step S10. In step S11, the device identification apparatus 200 may obtain a target packet from the identification target device 100. In step S12, a model name selection may be requested from the device identification apparatus 200 to the user terminal 300, and a second model name may be selected by the user terminal 300 in step S13. Thereafter, in step S14, the target packet of the identification target device 100 and the second model name may be mapped by the device identification apparatus 200.

Thereafter, the target packet mapped in step S15 and the second model name may be transmitted to the cloud server 250.

In step S16, the pattern of the target packet may be extracted by the cloud server 250, and may be matched with the pattern of the corresponding identification information DB 10 in step S17. In step S18, the first model name corresponding to the matched pattern and the second model name may be compared, and in step S19, the first model name or the second model name may be provided to the user terminal 300 depending on the result whether the first model name and the second model name may be the same or different. At this time, based on the first model name and the second model name being different, the second model name may be provided to the user terminal 300 based on the reliability of the first model name being lower than the threshold reliability, and the first model name may be provided to the user terminal 300 based on the reliability of the first model name being higher than the threshold reliability.

So far, the device identification method described in the present specification has been described with reference to FIGS. 2 to 10.

FIG. 11 is an example hardware diagram illustrating a computing device 500.

As shown in FIG. 11, the computing device 500 may include one or more processors 510, a bus 550, a communication interface 570, a memory 530, which loads a computer program 591 executed by the processors 510, and a storage 590 for storing the computer program 591. However, FIG. 11 illustrates the components related to the embodiment of the present disclosure. It will be appreciated by those skilled in the art that the present disclosure may further include other general purpose components in addition to the components shown in FIG. 11.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art.

Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, based on loading the computer program 591 into the memory 530, the logic as shown in FIG. 4 may be implemented on the memory 530. An example of the memory 530 may be a RAM, but may not be limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module based on hardware and/or software well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure may be implemented. Based on loading the computer program 591 on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations may be shown in an order in the drawings, those skilled in the art will appreciate that many variations and modifications can be made to the embodiments without substantially departing from the principles of the present disclosure. The disclosed embodiments of the disclosure may be used in a generic and descriptive sense and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method performed by a computing device for identifying a device comprising:
   receiving a target packet from an identification target device;
   extracting a pattern of the target packet, the target packet being transmitted by the identification target device from the packet;
   matching the pattern of the target packet with a packet pattern stored in an identification information database (DB), wherein matching the pattern of the target packet comprises,
      identifying a range of an attribute value associated with one of the packet patterns stored in the identification information DB; and
      determining whether the attribute value associated with the target packet falls within the identified range;
   comparing a first model name with a second model name, the first model name corresponding to the packet pattern stored in the identification information DB, the second model name being selected by a user of a user terminal; and
   transmitting a proposed model name to the user terminal based on determining that the first model name and the second model name are different, the proposed model name being used to identify the identification target device for connection between the identification target device and the user terminal.

2. The method of claim 1,
wherein transmitting the proposed model name to the user terminal comprises,
   transmitting the first model name to the user terminal based on determining that the first model name and the second model name are different.

3. The method of claim 1,
wherein transmitting the proposed model name to the user terminal comprises,
   determining reliability of the first model name by calculating identification information reliability using collective intelligence, wherein the collective intelligence comprises a number of selections and a number of selection failures; and
   updating the identification information DB to replace the first model name with the second model name based on the reliability of the first model name being less than a threshold.

4. The method of claim 3,
wherein updating the identification information DB comprises,
   transmitting the second model name to the user terminal.

5. The method of claim 3,
wherein determining reliability of the first model name comprises,
   calculating the ratio of the number of times where the user selected the first model name as the model name of the identification target device over the number of times where the user selected the second model name as the model name of the identification target device.

6. The method of claim 1,
wherein matching the pattern of the target packet comprises,
   identifying the pattern of the target packet as a new packet pattern based on determining that the pattern of the target packet matches none of packet patterns stored the identification information DB, and
   registering the new packet pattern in the identification information DB.

7. The method of claim 6,
wherein registering the new packet pattern in the identification information DB comprises,
registering a model name selected by the user of the user terminal as the model name corresponding to the new packet pattern.

8. The method of claim 1,
wherein matching the pattern of the target packet comprises,
determining whether the number of packet patterns stored in the identification information DB is less than a predetermined minimum number; and
based on determining that the number of packet patterns are less than the predetermined minimum number, verifying a result of the matching using a random forest model.

9. The method of claim 1,
wherein matching the pattern of the target packet comprises,
determining a model classification, a product name and a model name of the identification target device using at least one of the number of packets, an IP address of a device from which the identification target device received a packet, transmission/reception time interval, burst information, the number of packets per second, packet transmission size per second, total transmission size, and packet time information associated with the identification target device.

10. The method of claim 1,
wherein receiving the target packet from the identification target device comprises,
receiving at least some of the target packets transmitted by the identification target device to another device.

11. The method of claim 1 further comprises,
requesting the user terminal to select a model name corresponding to the identification target device upon receiving the packet from the identification target device; and
receiving a selection of the model name corresponding to the identification target device from the user terminal.

12. A system for identifying a device comprising:
a device identification apparatus is configured to:
request a user terminal to select a model name corresponding to an identification target device upon receiving a target packet from the identification target device, and
receive a selection of the model name corresponding to the identification target device from the user terminal; and
a cloud server is configured to:
extract a pattern of the target packet received from the device identification apparatus,
match the pattern of the target packet with a packet pattern stored in an identification information database (DB), wherein matching the pattern of the target packet comprises,
identifying a range of an attribute value associated with one of the packet patterns stored in the identification information DB; and
determining whether the attribute value associated with the target packet falls within the identified range;
compare a first model name with a second model name, the first model name being corresponding to the packet pattern stored in the identification information DB, the second model name being selected by a user of the user terminal, and
transmit a proposed model name to the user terminal based on determining that the first model name and the second model name are different, the proposed model name being used to identify the identification target device for connection between the identification target device and the user terminal.

13. The system for identifying a device of claim 12,
wherein the cloud server transmits the first model name to the user terminal based on determining that the first model name and the second model name are different.

14. The system for identifying a device of claim 12,
wherein the cloud server determines reliability of the first model name by calculating identification information reliability using collective intelligence, wherein the collective intelligence comprises a number of selections and a number of selection failures, and updates the identification information DB to replace the first model name with the second model name based on the reliability of the first model name being less than a threshold.

15. The system for identifying a device of claim 14,
wherein the cloud server transmits the second model name to the user terminal.

16. An apparatus for identifying a device comprising:
a processor;
a network interface;
a memory executed by the processor to load a computer program; and
a storage for storing the computer program,
wherein the computer program comprises,
an instruction for receiving a target packet from an identification target device;
an instruction for extracting a pattern of a target packet, the target packet being transmitted by the identification target device from the packet;
an instruction for matching the pattern of the target packet with at least one of packet patterns stored in an identification information database (DB), wherein matching the pattern of the target packet comprises,
identifying a range of an attribute value associated with one of the packet patterns stored in the identification information DB; and
determining whether the attribute value associated with the target packet falls within the identified range;
an instruction for comparing a first model name with a second model name, the first model name being corresponding to the packet pattern stored in the identification information DB, the second model name being selected by a user the user terminal; and
an instruction for transmitting a proposed model name to the user terminal based on determining that the first model name and the second model name are different, the proposed model name being used to identify the identification target device for connection between the identification target device and the user terminal.

17. The apparatus for identifying a device of claim 16,
wherein the instruction for transmitting the proposed model name to the user terminal comprises,
an instruction for transmitting the first model name to the user terminal based on determining that the first model name and the second model name are different.

18. The apparatus for identifying a device of claim 16,
wherein the instruction for transmitting the proposed model name to the user terminal comprises,
an instruction for determining reliability of the first model name by calculating identification information reliability using collective intelligence, wherein the collective intelligence comprises a number of selections and a number of selection failures; and an instruction for updating the identification information DB to replace the first model name with the second model name based on reliability of the first model name being less than a threshold.

19. The apparatus for identifying a device of claim 18, wherein the instruction for updating the identification information DB comprises, an instruction for calculating the ratio of the number of times where the user selected the first model name as the model name of the identification target device over the number of times where the user selected the second model name as the model name of the identification target device.

* * * * *